United States Patent [19]

Newman, Jr.

[11] Patent Number: 5,555,150
[45] Date of Patent: Sep. 10, 1996

[54] SURGE SUPPRESSION SYSTEM

[75] Inventor: Robert C. Newman, Jr., Emmaus, Pa.

[73] Assignee: Lutron Electronics Co., Inc., Coopersburg, Pa.

[21] Appl. No.: 424,111

[22] Filed: Apr. 19, 1995

[51] Int. Cl.$^6$ .................................................. H02H 9/04
[52] U.S. Cl. ............................. 361/56; 361/58; 361/91
[58] Field of Search ................................ 361/111, 56, 91, 361/58

[56] References Cited

U.S. PATENT DOCUMENTS

| | | | |
|---|---|---|---|
| 4,168,514 | 9/1979 | Howell | 361/56 |
| 4,210,846 | 7/1980 | Capewell et al. | 315/121 |
| 4,288,833 | 9/1981 | Howell | 361/124 |
| 4,350,935 | 9/1982 | Spira et al. | 315/291 |
| 4,728,866 | 3/1988 | Capewell et al. | 315/224 |
| 4,797,599 | 1/1989 | Ference et al. | 315/194 |
| 4,912,589 | 3/1990 | Stolarczyk | 361/56 |
| 5,055,742 | 10/1991 | Jurell et al. | 315/94 |
| 5,144,205 | 9/1992 | Motto et al. | 315/244 |
| 5,173,643 | 12/1992 | Sullivan et al. | 315/276 |
| 5,327,319 | 8/1993 | Lee et al. | 361/56 |
| 5,388,021 | 2/1995 | Stahl | 361/56 |

Primary Examiner—Todd DeBoer
Attorney, Agent, or Firm—Woodcock Washburn Kurtz Mackiewicz & Norris

[57] ABSTRACT

Disclosed is a surge suppression system employed in a system comprising Hot and Neutral power line segments coupled via a filter to protected electronic circuitry. The surge suppression elements include a spark gap comprising a first electrode connected to the Neutral line segment and a second electrode connected to the ground potential; and a voltage clamping device electrically connected to the Hot and Neutral line segments at a point which is electrically closer to the protected electronic circuitry than the spark gap. The invention permits the filter to ring up to high voltages, and provides a mechanism whereby electrical breakdown occurs at a prescribed point. Surge suppression is provided after the filter by the single ungrounded clamping device.

13 Claims, 1 Drawing Sheet

SURGE SUPPRESSION SYSTEM

FIELD OF THE INVENTION

The present invention relates generally to the field of surge suppression to protect electronic circuitry, and more particularly to a surge suppression system requiring only one clamping device (e.g., MOV).

BACKGROUND OF THE INVENTION

Voltage surge and voltage transient suppressors are commonly employed between a power source and its electrical load. Such suppressors protect equipment from surges and transient spikes that can occur on a power line as a result of inductive load switching, lightning strikes, and other transient events on a power line. Surge suppressors can also prevent switching transients generated within a load from being reflected back into the power source and to other equipment.

For certain applications, the surge suppressor is required to meet the standards specified by ANSI standard C62.41 (IEEE Standard 587-1980), which, for example, requires that 1.2×50 µs, 6000 V and 8×20 µs, 3 kA voltage and current impulse waves, respectively, must be attenuated to less than two times the nominal peak system voltage. The suppressor should be able to dissipate the energy contained in the spike as limited by the impedance of the source, and the leakage or standby current drawn by the suppressor should be limited to 1% of the rated line current.

Metal oxide varistors (MOVs) are often employed as surge suppressors. MOVs are voltage clamping devices and are usually connected directly across a power line. An MOV does not clamp until the occurrence of a voltage transient (spike) exceeding the line voltage by a sufficient amount. As the voltage transient rises, the MOV's nonlinear impedance results in a current spike through the MOV that rises faster than the voltage across it. This produces the desired voltage clamping action.

Spark gaps are also employed in surge suppression systems. A gas tube is essentially a spark gap with the electrodes hermetically sealed in a gas-filled ceramic enclosure to lower the breakover (or breakdown) voltage. This type of device is small and inexpensive and has the capability of withstanding pulse currents of up to 20,000 A. When the gas tube breaks over, the typical arc voltage ranges from 10 to 30 V. However, the breakdown voltage varies, since it is dependent on the rise time of the applied surge. For example, the typical sparkover voltage for a presently available gas tube rated for a 460 V AC application ranges from 1100 volts for a 100 V per microsecond surge to 1500 V for a 10 kV per microsecond surge. Thus, depending on the applied transient, several microseconds may elapse before a typical gas tube arcs over, leaving the leading portion of the surge intact to be passed on to the protected equipment.

Although the gas tube diverts the majority of the surge current when it breaks over, the leading portion of the surge, the "surge remnant," can contain a considerable amount of energy and have a high voltage amplitude. To clip the surge remnant, a common practice is to insert an L-section suppression circuit in the line following the gas tube. The L-section suppression circuit includes a series impedance and a voltage clamping device, such as an MOV, connected across the power line. The series impedance is connected between the gas tube and the clamp and can simply be a resistor or an inductor, or both. The impedance must be high enough in value to guarantee gas tube breakover so that the clamp only clips and diverts the energy in the remnant, not the energy in the entire surge.

A problem associated with gas tubes is "follow-on" current, which is the current from the power source that continues flowing through the gas tube after the surge current terminates. In AC circuits, the follow-on current clears when the line current goes through zero but can reappear on the next cycle of the line current. In DC applications, a separate means for extinguishing the arc must be included in the circuit.

Further information on the surge suppression art can be found in U.S. Pat. No. 5,388,021, Feb. 7, 1995, titled "Voltage Surge Suppression Power Circuits." This patent discloses circuits that employ clusters of two or more MOVs connected in parallel for suppressing surges and transients.

Complying with the ANSI standards for line-connected equipment usually requires the use of MOVs connected from Hot to Neutral, Hot to Ground, and Neutral to Ground. Although MOVs perform reasonably well in protecting electronic equipment, they present a number of problems, including:

1. Cost: MOVs are relatively expensive and difficult to install.
2. Safety: MOVs fail very violently if operated at continuous voltages above their ratings.
3. Manufacturability: MOVs connected to ground make performing hipot (high potential) dielectric testing nearly impossible, since the hipot test voltage cannot be set above the rating of the MOV connected to ground.

SUMMARY OF THE INVENTION

A goal of the present invention is to achieve surge suppression or survival with a minimal use of MOVs. Another goal of the invention is to avoid connecting an MOV to ground.

The present invention is preferably employed in a system comprising Hot and Neutral power line segments coupled via a filter to protected electronic circuitry. Typically, at least one component of the filter is connected to a ground potential. The invention involves the use of a spark gap comprising a first electrode connected to the Neutral line segment and a second electrode connected to the ground potential. In addition, a voltage clamping device is electrically connected to the Hot and Neutral line segments at a point which is electrically closer to the protected electronic circuitry than the spark gap. The invention permits the filter to ring up to high voltages, and provides a mechanism (spark gap) whereby electrical breakdown occurs at a prescribed point. Surge suppression is provided after the filter by the single ungrounded clamping device.

In one presently preferred embodiment of the invention, the voltage clamping device is an MOV. Moreover, this embodiment further comprises a first capacitor coupled between the Hot line segment and the ground potential; a second capacitor coupled between the ground potential and the Neutral line segment; a trans, former comprising a primary winding and a secondary winding, the primary winding forming a part of the Hot line segment and the secondary winding forming a part of the Neutral line segment; an inductor coupled between the secondary winding and the second capacitor, the inductor forming another part of the Neutral line segment; and a rectifier comprising a first AC input terminal coupled to the Hot line segment and a second AC input terminal coupled to the Neutral line segment, and first and second output terminals; coupled to the protected electronic circuitry. The MOV is connected to the AC input terminals of the rectifier.

Other features of the invention are disclosed below.

BRIEF DESCRIPTION OF THE DRAWING

The drawing is a schematic diagram of one presently preferred embodiment of a surge suppression system in accordance with the present invention.

DETAILED DESCRIPTION OF PREFERRED EMBODIMENTS

Figure 1:
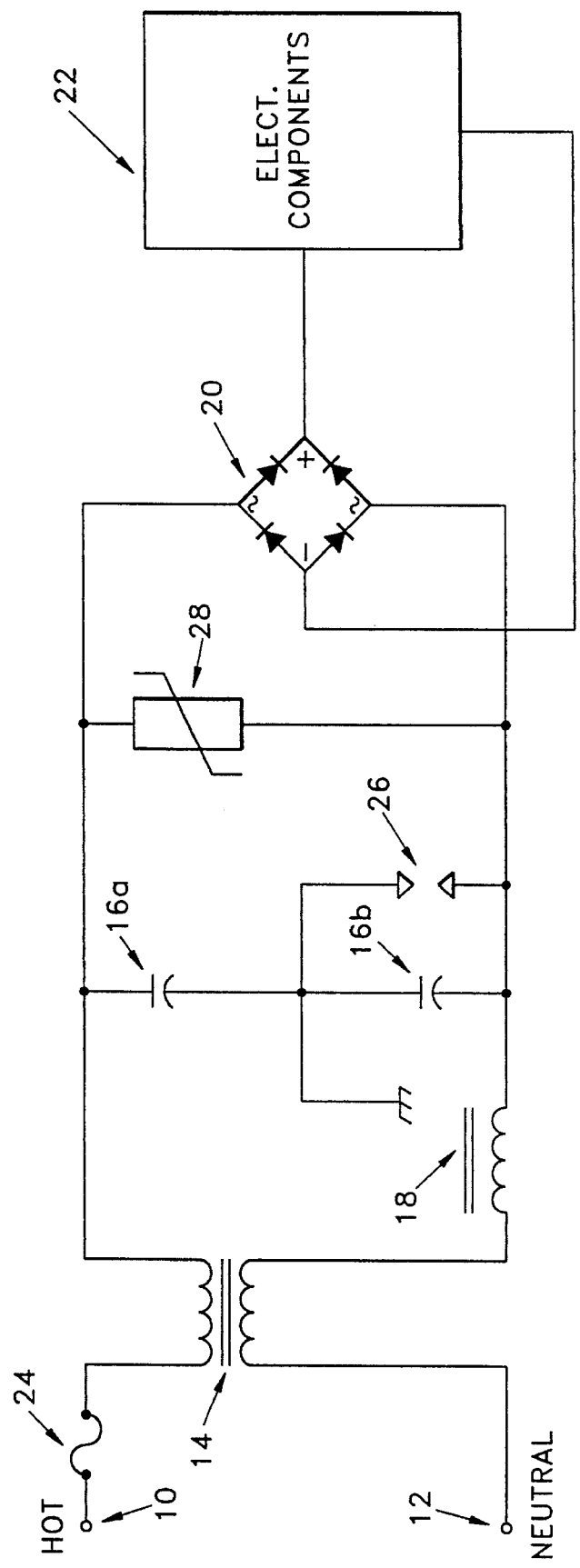

As shown in FIG. 1, the present invention may be employed in a system in which Hot 10 and Neutral 12 power lines are coupled, via a transformer 14; RFI filter comprising capacitors 16a, 16b and magnetic core inductor 18; and bridge rectifier 20, to circuitry comprising electronic components 22. A fuse 24 is inserted in the Hot segment 10 of the power line, as shown. In addition, as described in more detail below, the inventive system includes a spark gap 26 coupled from Neutral to Ground (in parallel with capacitor 16b) and a clamping device (MOV) 28 coupled to the AC input terminals of the bridge 20. This system provides compliance with the ANSI standard for surge suppression. It also provides the capability of performing low cost hipot tests on the finished product.

In the presently preferred embodiment of the system of FIG. 1, the transformer 14 has an inductance of 1.5 mH, capacitors 16a, 16b each have a capacitance of 2,200 pF, and the inductor 18 has an inductance of 1.3 mH.

Presently preferred embodiments of the invention are especially useful in protecting electronic ballasts, switch-mode power supplies, and other equipment with EMI (electromagnetic interference) and RFI (radio frequency interference) suppression networks connected between the power line and electronic components. The present inventor has discovered that surge voltages cause a resonant ringing with filter components in, e.g., an electronic ballast. This ringing action greatly amplifies the surge voltage applied to the electronic components in the ballast. For example, a surge voltage of 4,000 to 6,000 V can be amplified to greater than 20 kV. Dealing with 20 kV on a circuit board and preventing the ringing action in the filter is difficult because all forms of damping tend to significantly reduce the RFI suppression capabilities of the filter. The present invention permits the RFI filter to ring up to high voltages, and provides a mechanism whereby electrical breakdown occurs at a prescribed point. Surge suppression is provided after the RFI filter by a single ungrounded MOV.

If only one MOV 28 is used as in the preferred embodiments, the MOV should be located after the filter network. This single surge suppression device provides protection from both differential mode (Hot to Ground) and common mode (Hot and Neutral to Ground) surges. This is a feature not previously achieved with only one surge suppression component.

The spark gap 26 provides a controlled location for breakdown of the high voltage generated in the RFI filter. It is highly undesirable for an arc to form from Hot to Ground or Hot to Neutral because the applied line voltage could sustain the arc, which can cause failure of the product. However, by dissipating the surge energy in an arc from Neutral to Ground, the likelihood of a sustained arc is minimized. Thus, the arc is safely extinguished and the system survives the electrical transient.

The spark gap 26 can be advantageously implemented with an air gap in a PC board to prevent carbon tracking from arcing. This prevents a lowering of the breakdown voltage of the spark gap over repeated usage.

The present invention may be employed in other specific forms without departing from the spirit or essential attributes thereof. Accordingly, reference should be made to the following claims rather than to the foregoing specification as indicating the true scope of the invention.

I claim:

1. In a system comprising Hot and Neutral power line segments coupled via a filter to protected electronic circuitry, wherein at least one component of said filter is connected to a ground potential, the improvement comprising:

(a) a spark gap comprising a first electrode connected to said Neutral line segment and a second electrode connected to said ground potential; and (b) one and only one voltage clamping device electrically connected to said Hot and Neutral line segments whereby the system avoids the formation of arcs from Hot to ground or Hot to Neutral, thus minimizing the likelihood of a sustained arc, and whereby the system provides protection from both differential mode (Hot to ground) and common mode (Hot and Neutral to ground) surges with only a single voltage clamping device.

2. A system as recited in claim 1, wherein said voltage clamping device is a metal oxide varistor (MOV) and wherein the electrical path length from the voltage clamping device to the protected electronic circuitry is shorter than the electrical path length from the spark gap to the protected electronic circuitry.

3. A system as recited in claim 1, wherein said filter comprises a first capacitor coupled between said Hot line segment and said ground potential, and a second capacitor coupled between said ground potential and said Neutral line segment.

4. A system as recited in claim 1, wherein said filter comprises a transformer comprising a primary winding and a secondary winding, said primary winding forming a part of said Hot line segment and said secondary winding forming a part of said Neutral line segment.

5. A system as recited in claim 4, wherein said filter further comprises an inductor coupled between said secondary winding and said spark gap, said inductor forming another part of said Neutral line segment.

6. A system as recited in claim 1, further comprising a rectifier comprising a first AC input terminal coupled to said Hot line segment and a second AC input terminal coupled to said Neutral line segment; and first and second output terminals coupled to said protected electronic circuitry.

7. A system as recited in claim 6, wherein said voltage clamping device is connected to the AC input terminals of said rectifier.

8. A system as recited in claim 1, wherein said voltage clamping device is a metal oxide varistor (MOV), and comprising:

a first capacitor coupled between said Hot line segment and said ground potential; a second capacitor coupled between said ground potential and said Neutral line segment;

a transformer comprising a primary winding and a secondary winding, said primary winding forming a part of said Hot line segment and said secondary winding forming a part of said Neutral line segment;

an inductor coupled between said secondary winding and said second capacitor, said inductor forming another part of said Neutral line segment; and a rectifier comprising a first AC input terminal coupled to said Hot line segment and a second AC input terminal coupled to said Neutral line segment; and first and second output terminals coupled to said protected electronic circuitry;

wherein said voltage clamping device is connected to the AC input terminals of said rectifier.

9. A method for suppressing voltage surges in a system comprising Hot and Neutral power line segments coupled via a filter to protected electronic circuitry, wherein at least one component of said filter is connected to a ground potential, the method comprising the steps of:

(a) providing a mechanism whereby electrical breakdown occurs at a prescribed point; and (b) providing voltage clamping with one and only one voltage clamping device connected between said Hot and Neutral power line segments; whereby the system avoids the formation of arcs from Hot to ground or Hot to Neutral, thus minimizing the likelihood of a sustained arc, and whereby the system provides protection from both differential mode (Hot to ground) and common mode (Hot and Neutral to ground) surges with only a single voltage clamping device.

10. A method as recited in claim 9, wherein said mechanism whereby electrical breakdown occurs at a prescribed point comprises a spark gap comprising a first electrode connected to said Neutral line segment and a second electrode connected to said ground potential.

11. A method as recited in claim 9, wherein said voltage clamping is provided by a single ungrounded metal oxide varistor and wherein the electrical path length from the voltage clamping device to the protected electronic circuitry is shorter than the electrical path length from the prescribed point at which breakdown occurs to the protected electronic circuitry.

12. A system comprising:

(a) Hot and Neutral power line segments coupled via a filter to protected electronic circuitry, wherein at least one component of said filter is connected to a ground potential;

(b) a mechanism whereby electrical breakdown occurs at a prescribed point in said filter; and (c) one and only one ungrounded voltage clamping device connected to said filter between said Hot and Neutral line segments; whereby the system avoids the formation of arcs from Hot to ground or Hot to Neutral, thus minimizing the likelihood of a sustained arc, and whereby the system provides protection from both differential mode (Hot to ground) and common mode (Hot and Neutral to ground) surges with only a single voltage clamping device.

13. A system as recited in claim 12, wherein said mechanism comprises a spark gap comprising a first electrode connected to said Neutral line segment and a second electrode connected to said ground potential; and wherein said voltage clamping device is electrically connected to said Hot and Neutral line segments at a point which is electrically closer to said protected electronic circuitry than said spark gap.

* * * * *